Dec. 28, 1926.　　　　　　　　　　　　　1,612,542
W. W. SLOANE
TRACK GUIDED VEHICLE
Original Filed Oct. 29, 1925　　3 Sheets-Sheet 1

Inventor
William W. Sloane
by Clarence J. Poole
Attorney

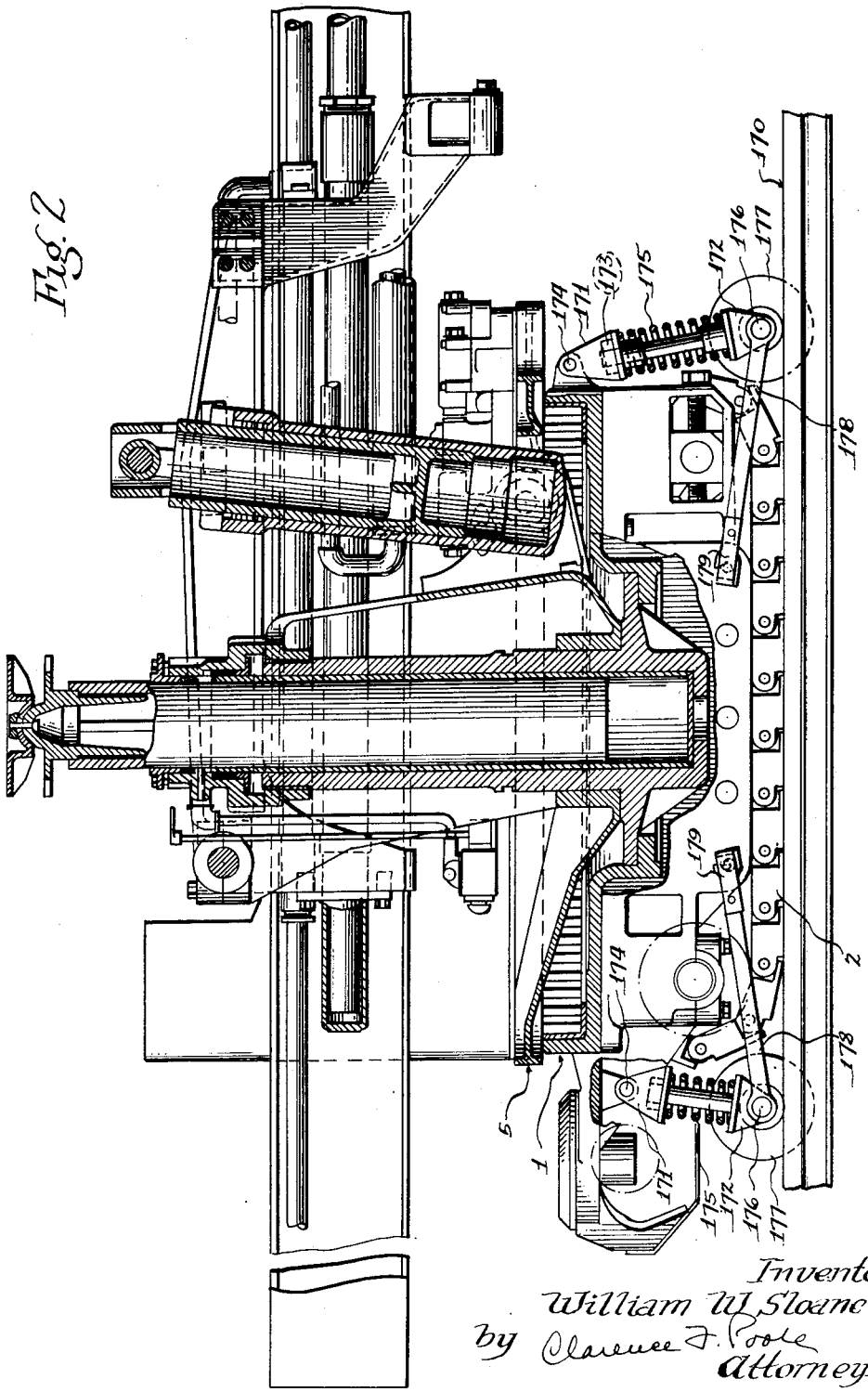

Dec. 28, 1926.  
W. W. SLOANE  
1,612,542  
TRACK GUIDED VEHICLE  
Original Filed Oct. 29, 1925   3 Sheets-Sheet 3
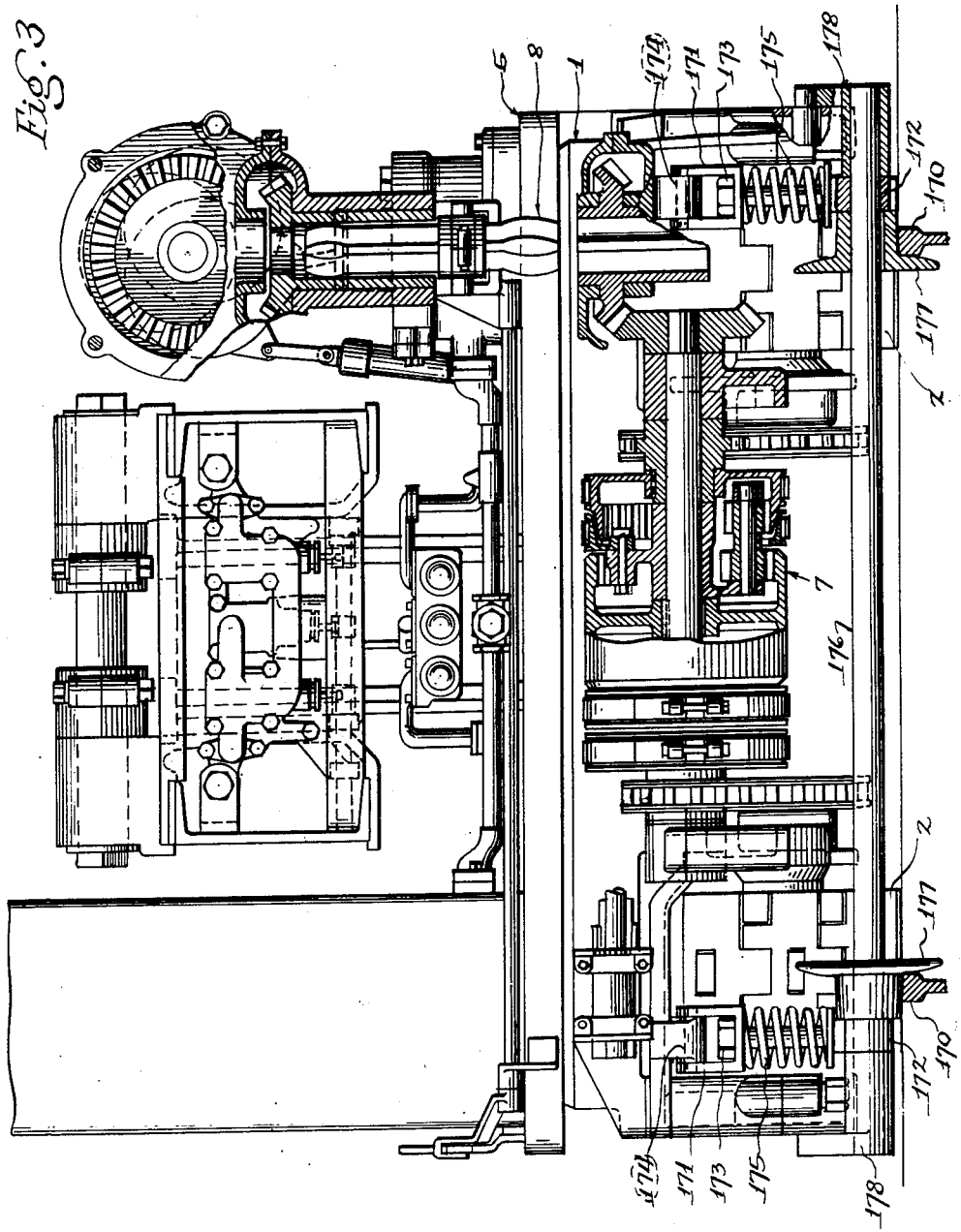
Inventor  
William W. Sloane  
by Clarence F. Poole  
Attorney Patented Dec. 28, 1926.

1,612,542

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

TRACK-GUIDED VEHICLE.

Original application filed October 29, 1925, Serial No. 65,549. Divided and this application filed April 30, 1926. Serial No. 105,629.

This invention relates to vehicles of the continuous tread type and has for its main object the provision of such a vehicle which operates and is guided on railway tracks, the mechanism being preferably adapted for operating on the ground also. The invention is particularly adapted for application on power shovels such as are used in mines although not limited to this use alone.

Referring to the drawings:

Figure 2 is an enlarged vertical sectional view through the central part of the machine;

Figure 3 is a rear elevation of the machine with parts broken away and in section and with parts omitted.

Like numerals refer to like parts throughout the several figures.

Figure 1:
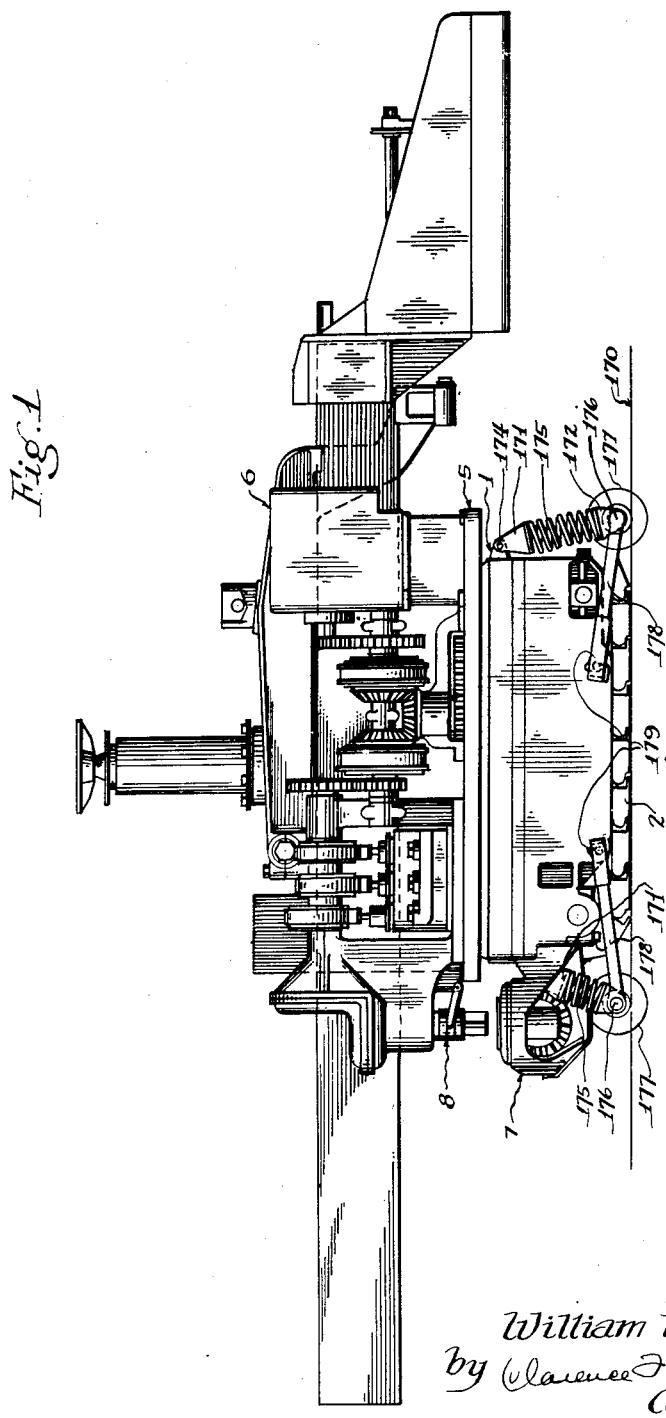
Figure 1 is a side elevation of a power shovel embodying one form of my invention.

Referring now to the drawings 1 designates a base frame which is carried on laterally spaced continuous tread mechanisms 2 of usual construction which are adapted for the propulsion of the shovel.

A turntable or rotatable frame 5 is carried by the base 1 for angular movement about a centrally disposed vertical axis.

The shovel is operated by an electric motor 6 mounted on the turntable, and for purposes of driving the continuous tread mechanisms 2, a transmission mechanism, generally indicated at 7, is mounted on the base 1 at its rear end for selectively driving the continuous tread mechanisms 2, and this transmission mechanism is driven from the motor 6 through a releasable driving device, generally indicated at 8, in one position of the turntable with respect to the base 1.

The mechanism for driving the continuous tread mechanisms 2 from the motor 6 need not be described further for the present purposes, but is fully described and claimed in my co-pending application for Letters Patent of the United States for improvements in propulsion means for power shovels or the like, Serial Number 105,630, filed April 30, 1926, which is a division of my co-pending application for Letters Patent of the United States for improvements in power shovels, Serial Number 65,549, filed October 29, 1925, of which latter application this application is also a division.

In order that the shovel may be conveniently moved along railway tracks with the continuous tread mechanisms 2 engaged on respective rails 170 or the track for propelling movement therealong the following guide means is provided:

Pairs of transversely spaced extensible arms are pivoted on the frame on aligned axes at respective ends of the frame. These arms comprise pivot parts 171 and outer parts 172 having rod portions slidably engaged in the pivot parts and nuts 173 screw threaded on said rod portions to maintain the arms in assembly. The pivot parts 171 are pivotally mounted on the base by means of removable pivot pins 174, and coiled compression springs 175 encircle the rod portions of the parts 172 and abut both parts to yieldably extend the arms. Shafts 176 are journaled in transverse bores in the outer ends of respective transversely spaced pairs of these arms, and pairs of oppositely disposed flanged rollers 177 are secured in spaced relation on these shafts. These rollers are disposed on the inside of respective to the pivot arms, and are adapted to engage downwardly on the rails 170 of the track with the flanges thereof at the insides of respective rails for guiding said continuous tread mechanisms engaged on the rails of the tracks for propelling movement therealong. Arms 178 are journaled at ends thereof on respective shafts 176 on the outside of the pivot arms and have the outer ends thereof detachably secured to the frame 1 in a usual manner, as designated at 179, for securing the pivot arms in downwardly projecting positions with the flanged rollers 177 engaged with the rails of the track. The springs 175 compensate for variations in the track. The guiding means just described, being independent of the continuous tread means, permits the apparatus to operate on curved as well as straight tracks, and as shown is easily removed from or assembled on the frame 1 by the removable pins 174 and the detachable devices 179.

While I have herein shown and described one form of my invention, I do not wish to be limited to the precise details of construction or arrangements of parts herein shown and described except as specifically limited in the appended claims.

I claim as my invention:

1. In a power shovel, the combination with a frame and continuous tread means carrying the frame, of means independent of said continuous tread means and engageable with a railway track for guiding said continuous tread means engaged on the track for movement therealong.

2. In a power shovel, the combination with a frame and continuous tread means carrying the frame, of means carried with the frame and comprising flanged rollers engageable with the rails of a railway track for guiding said continuous tread means engaged on the rails of the track for propelling movement therealong.

3. In a power shovel, the combination with a frame and continuous tread means carrying the frame, of means carried with the frame and comprising flanged rollers at opposite ends of said continuous tread means and engageable downwardly on respective rails of a railway track with the flanges thereof at the insides of said rails for guiding said continuous tread means engaged on the rails of the track for propelling movement therealong.

4. In a power shovel, the combination with a frame and continuous tread means carrying the same, of means carried with the frame and comprising flanged rollers engageable downwardly on the rails of a railway track and means for yieldably urging said rollers downwardly on the rails for guiding said continuous tread means engaged on the rails of the track for propelling movement therealong.

5. In a power shovel, the combination with a frame and continuous tread means carrying the same, of means carried with the frame and comprising flanged rollers at opposite ends of said continuous tread means and engageable downwardly on respective rails of a railway track with the flanges thereof at the insides of the rails, and spring means yieldably urging said rollers downwardly on the rails for guiding said continuous tread means engaged on the rails of the track for propelling movement therealong.

6. In a power shovel, the combination with a frame and continuous tread means carrying the same, of extensible arms pivoted on the frame on transverse upwardly disposed axes, spring means on said arms and yieldably extending the same, flanged rollers carried at the free ends of said arms on transverse axes and engageable downwardly upon the rails of a railway track in positions of said arms projecting downwardly from their pivotal axes for guiding said continuous tread means engaged on the rails of the track for propelling movement therealong, and means for releasably securing said arms in said downwardly projecting positions.

7. In a power shovel, the combination with a frame and continuous tread means carrying the same, of pairs of transversely spaced extensible arms pivoted on the frame on aligned axes at respective ends of said continuous tread means, springs on respective arms and yieldably extending the same, shafts extending between and engaged with the free ends of respective pairs of arms, pairs of flanged rollers mounted on respective shafts and secured in spaced relation adjacent respective arms and engageable downwardly upon the rails of a railway track in positions of said arms projecting downwardly from their pivotal axes for guiding said continuous tread means engaged on the rails of the track for propelling movement therealong, additional arms pivotally secured with the free ends of respective said first mentioned arms, and means detachably securing said last mentioned arms with said frame for securing said first mentioned arms in said downwardly projecting positions.

Signed at Chicago, in the county of Cook and State of Illinois, this 28th day of April A. D. 1926.

WILLIAM W. SLOANE.